April 8, 1941.   O. F. QUARTULLO   2,237,575
RESILIENT TORSION SPRING SUSPENSION
Filed Dec. 31, 1937   6 Sheets-Sheet 1

INVENTOR:
ORPHEUS F. QUARTULLO
BY
ATTORNEY

April 8, 1941.  O. F. QUARTULLO  2,237,575
RESILIENT TORSION SPRING SUSPENSION
Filed Dec. 31, 1937   6 Sheets-Sheet 2
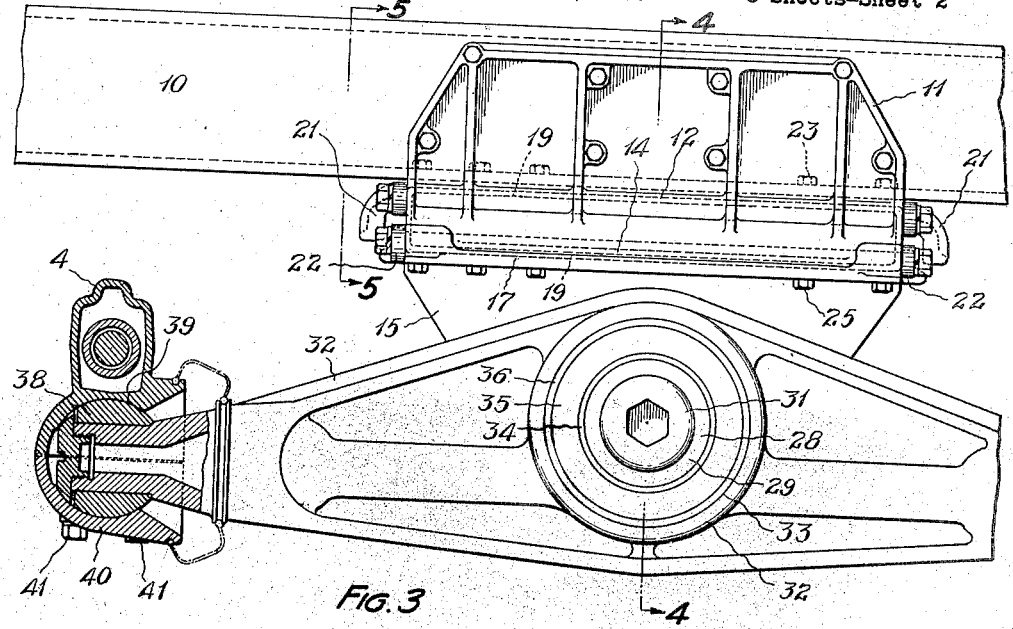
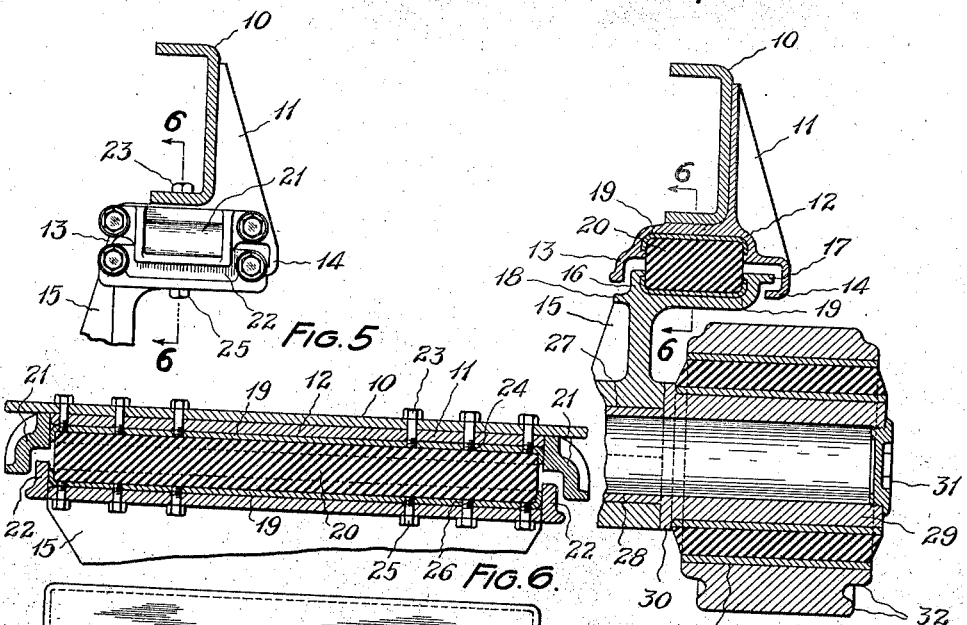
INVENTOR:
ORPHEUS F. QUARTULLO
BY
ATTORNEY.

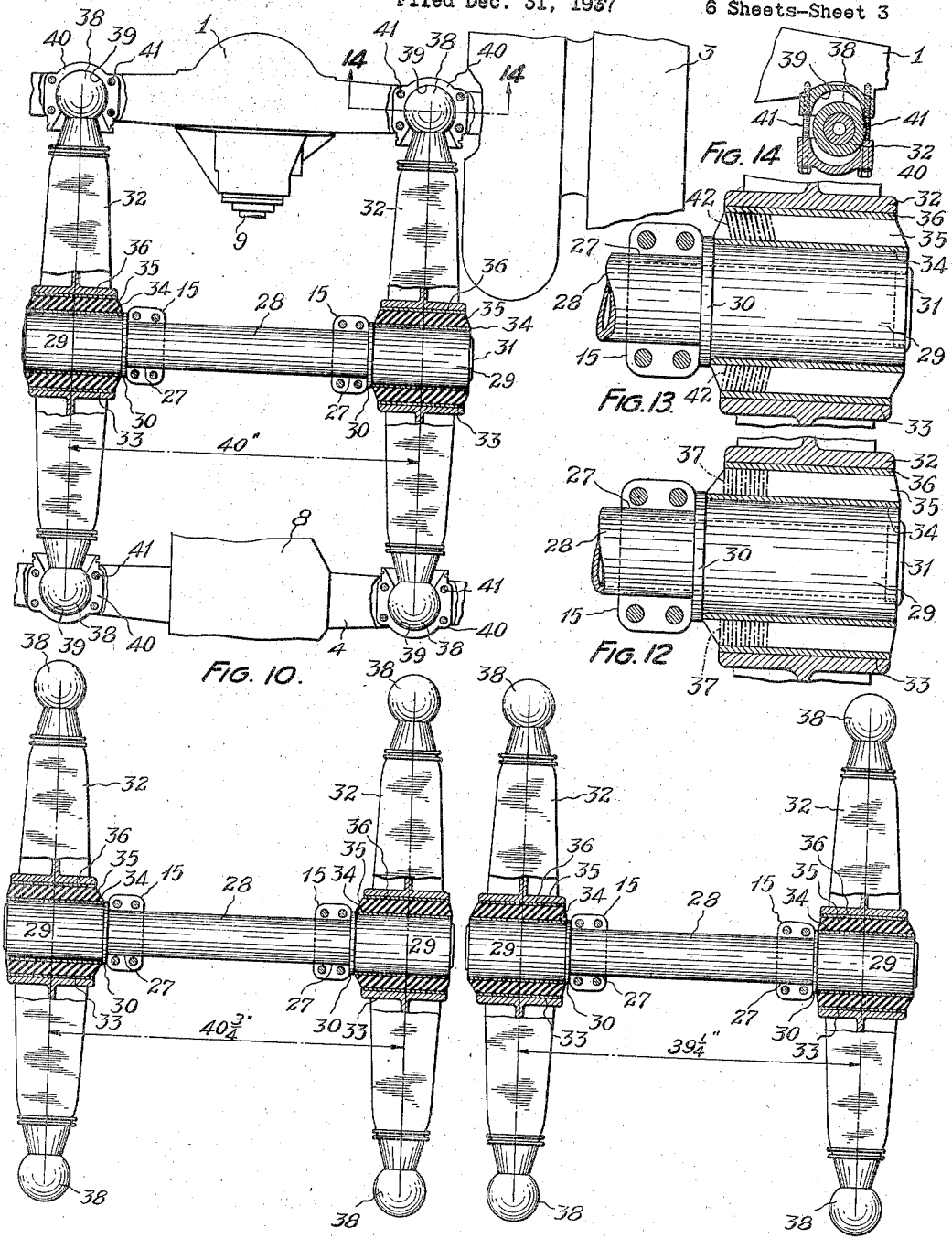

April 8, 1941.  O. F. QUARTULLO  2,237,575
RESILIENT TORSION SPRING SUSPENSION
Filed Dec. 31, 1937  6 Sheets-Sheet 5
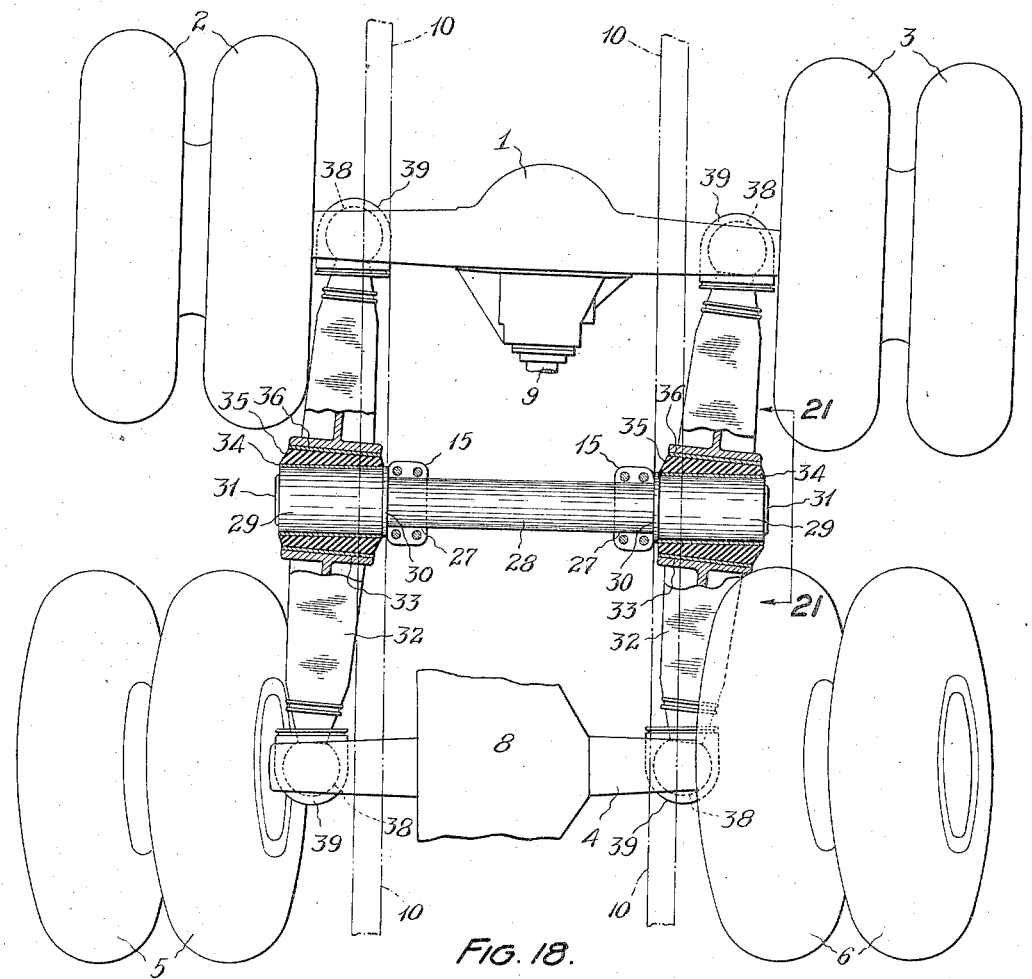
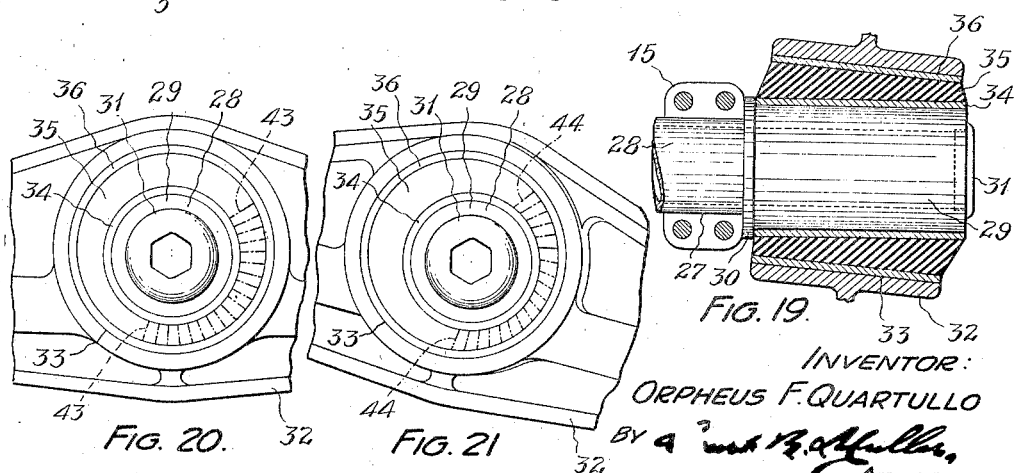
INVENTOR:
ORPHEUS F. QUARTULLO
ATTORNEY.

April 8, 1941.   O. F. QUARTULLO   2,237,575
RESILIENT TORSION SPRING SUSPENSION
Filed Dec. 31, 1937   6 Sheets-Sheet 6

INVENTOR:
ORPHEUS F. QUARTULLO
BY
ATTORNEY.

Patented Apr. 8, 1941

2,237,575

UNITED STATES PATENT OFFICE 2,237,575

RESILIENT TORSION SPRING SUSPENSION

Orpheus F. Quartullo, Shaker Heights, Ohio

Application December 31, 1937, Serial No. 182,777

3 Claims. (Cl. 280—124)

My invention pertains to a resilient torsion-reactive pivot appliance advantageously applicable to many lines of manufacture. One plural use is in a wheel truck assembly, for example, in a four-wheel drive structure comprising more than one differential driving axle structure together with rockable beams on each side of the vehicle for connecting corresponding ends of the axle structures.

I am fully aware that rubber has rapidly come into constantly extended use in automotive vehicles, in mountings, bearings, as a buffer or as an insulator, but I have failed of discovery of any teaching of its use as a torsion-reactive pivot appliance nor as a twistable part of the pivot at one end of one or more swingable connecting arms nor with like function at the pivot of a rockable member which latter is additionally subject to distortional strains consequent to forces acting to deflect it outside of the median plane of its arcuate range.

Four wheel drives for permitting both oscillatory and lateral-bodily shift of the rocking beams each of which carries corresponding ends of the two axle units have been used. Attempt has also been made to realize an equivalent yield through the use of rubber at the ball and socket connections at the ends of the beams stressing maintenance of a parallelogram, but that construction has caused severe wear on the bushings where the middle of the beam was oscillatorily mounted and frequently resulted in beam breakages because of the wrenching, twisting and bending stresses when the end of the beam became swung crosswise through a considerable arc. The danger of breakage of cast beams is proven by later adoption of alloy-steel beams. My solution, in feasible association with the disclosure of my Patent No. 2,041,484 of May 19, 1936, consists in provision of a rubber bushing at the middle-beam pivots. If axial movement of the beams on their pivot shafts is permitted with metal to metal contact, it is so incessant during travel of the vehicle as very quickly to cause wear requiring replacements.

My invention permits easing of torsional stresses during rocking of each beam in its mean vertical plane. It has withstood a load of 25,000 lbs. which is in excess of past or present requirement. During compound temporary distortions due not only to load, but to angular deflection in several possible directions, the rubber bushing constantly exerts a reacting force to restore the rocking connections to normal or equalized positions. With the size and proportions contemplated for the market, a five-eighths inch (⅝″) axial movement (of the beam middle—not of the bushing) must be foreseen because of arcuate swing of beam ends and variation in crosswise distance between the middle sections of the two beams. An origination which contributes to success is the preloading of the rubber bushing and then causing one cylindrical side of it to be displaced axially during assembly, to produce a state of stress, which initially produces about a three-sixteenths ($\frac{3}{16}$) shearing tension or preloading of the bushing and a functionating as would coil springs applied at opposite sides of the bushing confiners.

Deflections of several degrees in any direction or compound displacements may occur. I provide yield in any needed way with constantly exerted forces tending to restore to a leveling relationship.

My origination is a contributing factor together with the principles of my identified patent to the success of a structure permitting entire elimination of rear springs which sometimes weigh about 600 lbs. and cost close to one hundred dollars ($100.00). When it is realized that the most efficient truck operation requires full or nearly full loading and that when fully loaded the stronger springs offer very little functional yield and on the other hand that heavy springs are of little, if any, value when a truck is unloaded, the substituting merit of my originations becomes evidenced. Besides my novel rubber-bushing-mounting for the beam pivots, I provide (not as indispensable but somewhat advantageous cooperating additions) confined rubber-pad connectors over those lateral portions of the frame by which longitudinally spaced driving axle units are carried. Such strips are calculated to compress about three-sixteenths ($\frac{3}{16}$) of an inch under maximum load. A safety lock comprising hooks is also provided against the possibility of such rubber strips disintegrating or of having their functions otherwise destroyed or impaired.

I have realized that the nub of my present invention has widespread application. For instance, the application of my invention to coaches or busses might involve the modified incorporation shown in Figure 22 in which two axle or substructures each has each of its ends independently connected (as shown near its longitudinal middle) with the chassis frame, as part of the superstructure, by means of an arm and at either or both ends of the arm my pivot including the rubber bushing which latter reacts when subjected to opposite torsional stresses in response to displacements of the axle ends or relative bodily movements as between the axles and interconnecting vehicle body. As illustrated my pivot construction is employed to connect the four proximate ends of the two pairs of arms where they approach the frame about midway of the axles and where the four cooperating, bushing-attached pairs of parts of the four pivot constructions are secured one of each pair to the frame and one of each pair to an end of one of the four arms. Thus the bodily displacements are subject at quadrilateral-defining points to the yielding rubber-twisting restraint.

I believe distinct invention to be involved also in the method of making my pivot appliance whereby constantly to maintain its rubber element under an approximately predetermined measure of stress or in effect to preload the rubber. During assembly, the cooperating pivot parts, which (when attached one to each of the members to be pivotally connected) are complemented by the mutually affixed interposed rubber, are subjected to relative axial movement. Such relative axial movement is accomplished with the double-armed rocking beam pivot appliance by gravitationally interfitting with the spherical surfaces on the ends of the beam the sockets at the corresponding lateral ends of two axle structures whereupon the beam-carried bushing-enclosing cylinder becomes forcibly displaced axially with reference to the pivot part in turn enveloped by the bushing.

The objects of my invention are to perfect the interaction of the parts, to improve the traction, to minimize friction and wear, to avoid fracture and to enhance the riding qualities—all through the universality of pivotal action in a new location for a unique cooperative purpose and known to increase tire life.

Adverting to the drawings—

Fig. 3 is an enlarged side elevational view showing the chassis frame, the bracket for supporting the intermediate fixed trunnion rod, the axle supporting beam and the connection between the beam and the drive axle, this view being taken on the plane indicated by line 3, 3 in Fig. 1.

Fig. 4 is a vertical transverse sectional view taken on the plane indicated by line 4, 4 in Fig. 3.

Fig. 5 is a fragmentary end view taken on line 5, 5 of Fig. 3.

Fig. 6 is a longitudinal sectional view thru the rubber pad interposed between the two portions of the fixed axle supporting bracket this view being taken on the plane indicated by line 6, 6 in Figures 4 and 5.

Figures 7, 8, and 9 are detached side, plan and end views respectively of the rubber pad shown in the assembly in Fig. 6.

Figure 2:
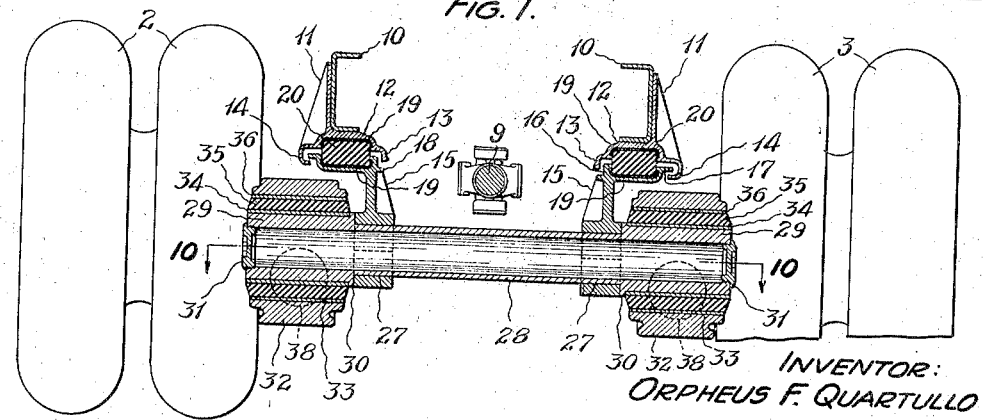
Fig. 2 is a vertical section taken on the plane indicated by line 2, 2 in Fig. 1.

Fig. 10 is a plan view taken on the plane indicated by line 10, 10 in Fig. 2 showing the drive axle supporting beams in their normal assembled position.

Fig. 11 is a view similar to Fig. 10 showing the axle supporting beams mounted on the fixed axle prior to assembling with the driving axles.

Fig. 12 is a diagrammatic enlarged view of a portion of Fig. 11 showing the normal position of certain imaginary fibers in the rubber of the bushing prior to the assembling of the beams in the drive axles as shown in Fig. 11.

Fig. 13 is a view similar to Fig. 12 showing the position of the imaginary fibers after the assembling of the beams with the drive axles as shown in Fig. 10 showing the preloaded condition of the rubber in the bushing, that is, the application of initial tension to the rubber material in this bushing.

Fig. 14 is a fragmentary sectional view taken on the plane indicated by line 14, 14 in Fig. 10 disclosing the simple method of assembling the ball ends of the beams in the sockets of the drive axles.

Fig. 15 is a view similar to Fig. 11 showing an opposite method of assembling the beams on the fixed axle.

Figure 1:
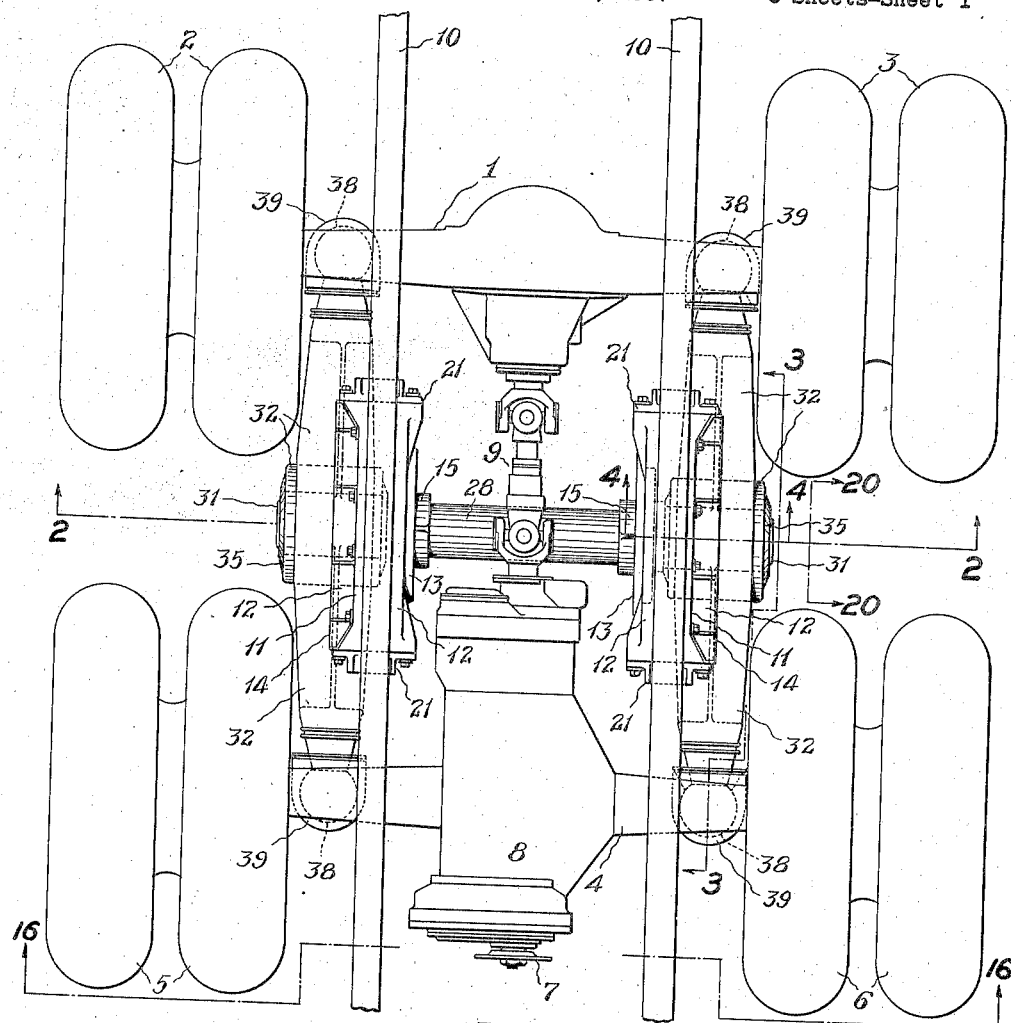
Fig. 1 is a plan view looking down on the rear portion of the chassis showing the two rear axles, the two axle supporting beams, the intermediate fixed cross axle and the brackets for supporting the cross axle.
Figure 16:
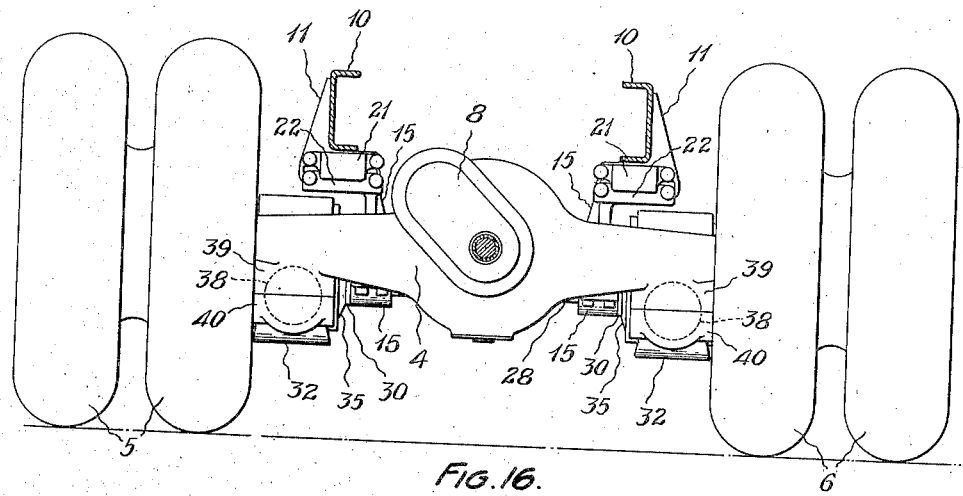

Fig. 16 is a front view of the twin rear axle drive showing all wheels in a level position on the ground, this view being taken on the plane indicated by line 16, 16 in Fig. 1.

Figure 17:
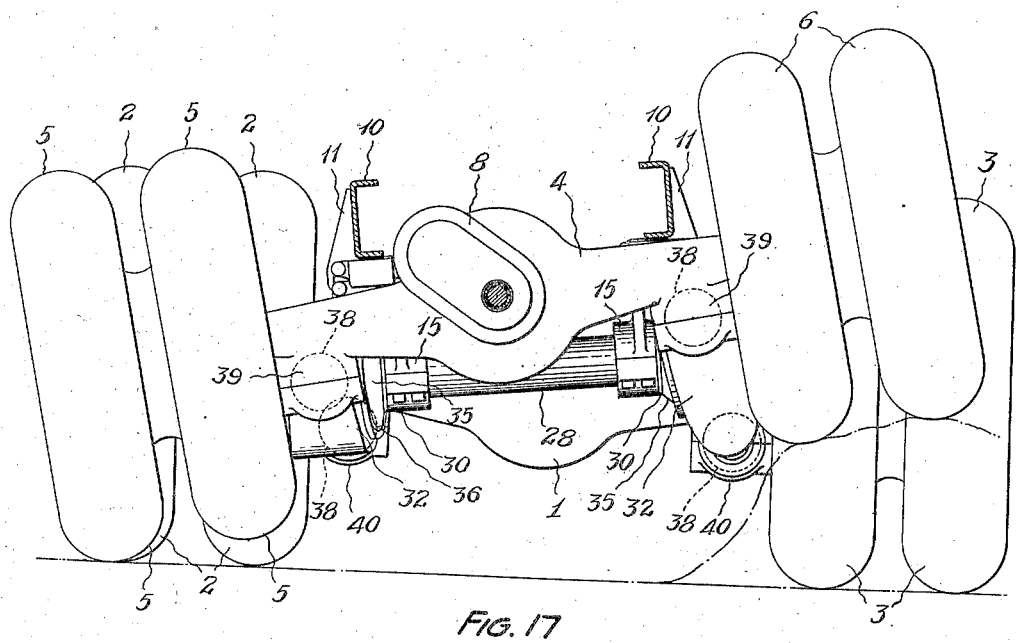

Fig. 17 is a view similar to Fig. 16 but showing the left front wheels elevated a very substantial amount as in riding over a projection, the rear wheels remaining upon level ground.

Fig. 18 is a plan view similar to Fig. 10 but showing the positions of the drive axles, axle supporting beams, fixed axle and rubber bushings, when the front left wheels are elevated as shown in Fig. 17.

Fig. 19 is an enlarged view of a portion of Fig. 18 showing the configuration of the bushing when the parts are in the position shown in Fig. 18.

Fig. 20 is a side elevation of the center of the beam and bushing when the wheels and beam are located on a level surface, this view being an enlarged view taken on line 20, 20 of Fig. 1.

Fig. 21 is a view similar to Fig. 20 but showing the position of the parts when the front left wheels are elevated, this view being taken from the plane indicated by line 21, 21 in Fig. 18.

Figure 22:
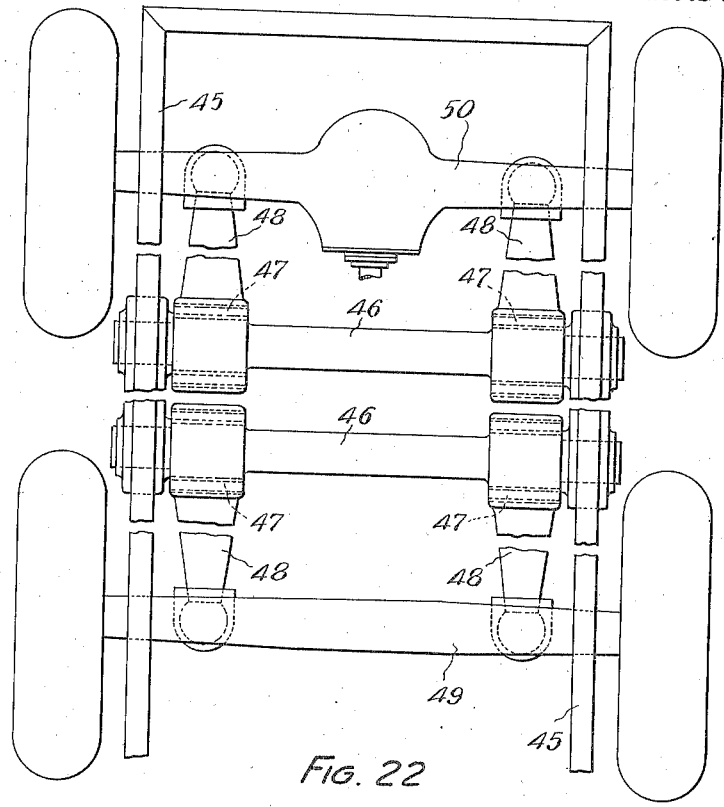

Fig. 22 is a simple outline as a diagrammatic plan showing a quadruple application of my invention to a bus or passenger coach.

Figures 23, 24:
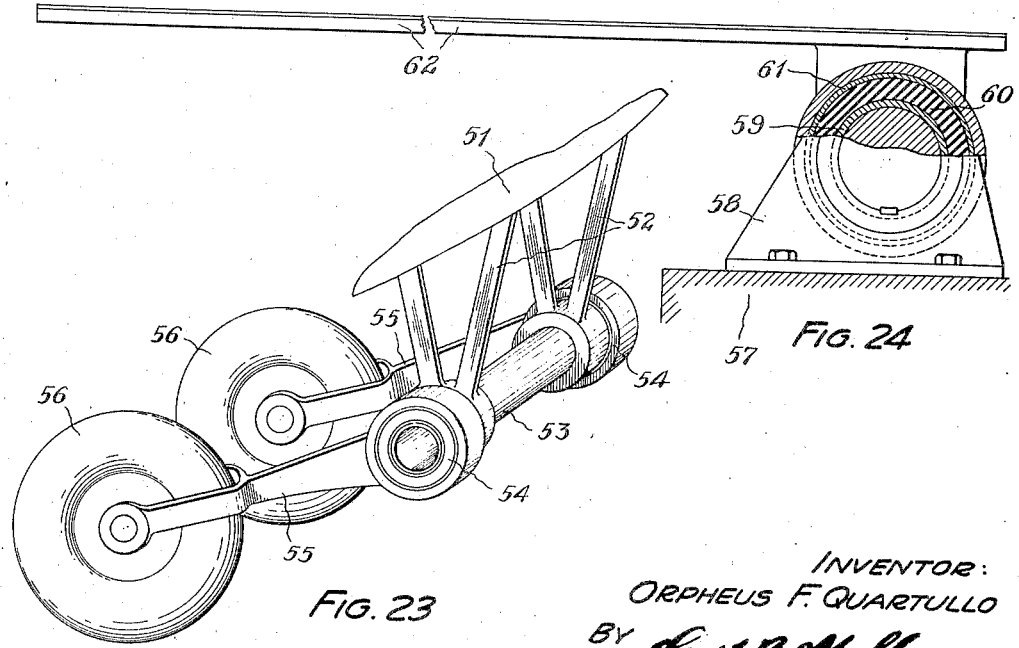

Fig. 23 is a view illustrating a feasible application of my resilient torsion-reactive pivot appliance as applied to the landing gear of an aeroplane.

Fig. 24 is a side elevation, partly in section, to portray the simple application of my rubber mounting to a spring board.

Figure 1 illustrates the application of the principle of my invention in a four wheel drive and each of the four wheels are commonly a dual unit at one of the four axle ends. A rear axle housing 1 carries on its one end the dual wheels 2 and on its other end the dual wheels 3. In tandem relation forwardly is another driving axle 4 and on its two ends are the wheels 5 and 6 respectively. The two axles are driven from a connector 7 and through a transmission of no consequence to my present invention, but the transmission train is disposed within the composite housing 8 and comprehends what I have shown, described and claimed in my recent application filed, December 23, 1937, Serial No. 181,383. In connection through the rear end of the transmission housing 8 is a universal joint connection to the differential axle in the housing 1, which connection I have designated with a numeral 9.

A frame 10, which is purposed to support any type of superstructure, comprises two side beams extending longitudinally across the axle structures 1 and 4. Inspection of Figures 1 to 9 will show each of the longitudinal frame members to have connected therewith, midway between the axle structures 1 and 4, sturdy depending brackets 11. Since the structure carried by each bracket and to be next described is duplicated, the singular number will be employed. The bracket 11 depends below the frame beneath which it is flared laterally in both directions at 12 to define a downwardly open undercut rectilinear recess enclosed on the inward side by a depending flange 13 and on the outward side by a depending flange which additionally has its edge 14 flanged at right angles in an inward direction, as most clearly illustrated in Figure 4. The flanges 13 and 14 may merge at the front and rear ends with the flanges 21 to form in conjunction an endless, depending enveloping flange. A complemental primary axle-supporting bracket 15 has its upper end disposed in spaced relation to the bottom of the frame-connected bracket 11 and with respect to which it may have limited relative movement as will next be explained.

The top of the bracket 15 carries an inward longitudinally extending and upwardly projecting flange 16 and an outward longitudinally extending and upwardly projecting flange 17 which together define a similar undercut rectilinear recess in vertically spaced apposition to the recess formed in the bracket 11. The flanges 16 and 17 may merge at the front and rear ends with the flanges 22 to form in conjunction an endless, upstanding enveloping flange. The bracket 15 is additionally fashioned with a horizontally and inwardly projecting flange 18 adapted normally to be in spaced apposition to the end of the flange 13 and the flange 17 has a horizontally and outwardly extending margin adapted normally to be in spaced apposition to the upper side of the inwardly turned flange 14. As will be evident upon inspection of Figure 4 a non-contactual emergency interlock is provided between the downwardly extending flanges on the bracket 11 and the upstanding flanges on the bracket 15 whereby adequate clearance is provided for limited relative movement in two right angularly related directions. The disclosed interlocked relationship is maintained by the interpositioning of a rubber pad assembly comprising a pair of similar though relatively reversed rectilinear, concavo-convex retainers 19, one adapted for snug occupancy of the recess in the bracket 11 and the other likewise adapted for snug occupancy of the recess in the bracket 15. The retainers 19 partially confine a rubber pad 20 which may be vulcanized to the interior of the retainers 19 and which observation of Figure 4 will disclose to be of such a thickness as to maintain the emergency-interlocked though spaced relationship between the brackets 11 and 15. As long as the rubber pad 20 performs its required function, no load will effect a metal to metal engagement as between the brackets 11 and 15. It is only against the always possible eventuality of a disintegration or other damage to the rubber pad 20 that the safety interlock is provided. As shown in Figure 3, the rubber pad 20 is confined at its ends by clip and cap screw combinations 21 secured to the bracket 11 and by similar clip and cap screw combinations 22 secured to the bracket 15. A series of cap screws 23 are passed through the bottom of the frame 10, through the bracket 11 and into tapped holes 24 in the upper of the two retainers 19 as shown in Figures 5 to 9. Similarly, a series of cap screws 25 are passed through the bracket 15 and into a correspondingly spaced row of tapped holes 26 in the lower retainer 19.

The lower ends of the two brackets 15 on opposite sides of the frame are each provided with a horizontally, crosswise extending bore 27 and the two bores 27 are in axial alinement. Mounted in the bores 27 is a hollow trunnion 28 and where the latter projects outwardly beyond each of the brackets 15 it is enlarged at 29, is provided outwardly adjacent to each bracket 15 with a flange 30 and has each of its extremities sealed by a closure 31. A double-armed beam 32 is adapted for rockable mounting upon each projecting end 29 of the trunnion 28 and has a middle bore 33 enveloping a projecting trunnion end though in spaced relation therearound. It is between each of the bores 33 and concentric trunnion enlargements where my composite rubber-including bushing is to be snugly fitted. The composite bushing includes an inner cylindrical tube 34 adapted to have a forced fit on the trunnion, a cylindrical section of rubber 35, which is shown to have ends slightly tapered in a radially outward direction not only substantially to equalize the annular area of its vulcanized contact with the tube 34 and its vulcanized cylindrically surfaced area of contact with its enclosing tube 36 because the latter is necessarily of larger diameter than the tube 34 but also to permit the tube 36 and beam 32 to move axially, as will be explained, without interfering with adjacent supports. It is to be understood that the exterior diameter of the tube 36 is of such a size as also to permit effecting a forced or pressed fit within the bore 33. The radial lines 37 shown on the rubber element 35 in Figure 12 are intended to indicate the normal position of certain imaginary fibers in the rubber, the usual section lining for the rubber 35 having been omitted in this view and also in Fig. 13 to be described, in order to permit the representation of these fibers. The extremities of the rocker beams 32 are fashioned to spherical form as indicated at 38. The ends 38 are to have ball and socket connection each with one end of one axle housing as portrayed in Figure 10 and in a manner common to the art. Since nothing is claimed or to be claimed for such ball and socket connections, they will be very briefly described. Each axle structure end (see Figure 14) carries just inside of its inner wheel a hemispherical socket 39 of a size for fitting with one half of the ball 38 and a detachable cap 40 interiorly of hemispherical contour is adapted in conjunction with the socket 39 to enclose a beam end and when secured through the medium of four cap screws 41 to constitute the conventional ball and socket connection. Supposing the final crosswise or center to center distance between the two rocking beams 32 to be forty inches (40") as marked by way of example in Figure 10, I have discovered a very simple yet highly advantageous manner of effecting the assembly of the ball and socket connections whereby initially to impose a stress in the rubber 35 which will be the equivalent of preloading it. Observation of Figure 11 and of the measured distance line between the longitudinal center lines of the two beams 32, as well as comparison of the upper ball ends as viewed in Figure 11 with the lower ball ends as viewed in Figure 10, will show the two beams of Figure 11 to be somewhat further separated, in fact, by a distance of forty and three-fourths inches (40¾"). That is a distance of separation which the two beams might initially have. Then when assembly of the ball and socket connections is to be effected, the balls 38 being eccentric by three-eighths of an inch as appears in Figure 14, by the engagement of the two spherical surfaces aided by a gravitational urge will force the two beams toward each other an aggregate distance of three-fourths (¾) of an inch whereby correspondingly to apply stress to the rubber fibers as intended to be indicated by the oblique lines 42 in Figure 13. When the four ball and socket connections have been effected, the beams will have shifted from the positions in which they appear in Figure 11 to the positions in which they appear in Figure 10, the outer bushing tubes 36 will have been caused to approach each other likewise with opposite axial displacements relative to the tubes 34 respectively and the rubber 37 will have become preloaded. The advantage of so placing rubber under stress or in effect to attain preloading for the desirable if not essential purpose of reducing side sway will be evident to those skilled in the art. An obviously simple modification is to have the two rocking beams initially somewhat closer together instead of further apart. Figure 15 illustrates their initial distance of separation as thirty-nine and one-fourth inches (39¼") so that when their connection with the axle structures is made as heretofore explained, they will be caused to separate until they are forty inches (40") apart which is a distance we have assumed as the standard distance between the sockets 39 at opposite ends of any one axle structure. As will be readily understood, forced displacement of the beams 32 in a direction away from each other will impose a stress in the rubber opposite to that shown in Figure 13 which was in consequence of a displacement of the two beams toward each other.

Figure 16 merely illustrates a normal level road surface position of the two axle structures for contrast with Figure 17 in which the left front dual wheel has become lifted and the front axle structure 4 swung through a rising arc. The plan view shown in Figure 18 illustrates what happens not only at the ball and socket connections, but of a special consequence here also what happens at the rubber mountings. Actually distortional yield occurs in the rubber which is compounded with a certain measure of torsional stress. Such compound stress is also shown in Figure 19 and I have endeavored to picture in Figures 20 and 21, the torsional displacement of the rubber fibers from their normal radial positions as designated by the numeral 43 in Figure 20 to their non-radial positions as designated by the numeral 44 in Figure 21. In other words, the rubber 35 will have its fibers assume the radial positions of Figure 20 which may be vertically eccentric due to superimposed load, when the chassis is as in Figure 16 and will have its fibers assume the non-radial or torsional as well as lateral misalined and eccentric position and also vertically eccentric deformation shown in Figure 21 when the chassis has its front axle housing 4 shifted to the position in which it appears in Figure 17. It will also appear from Figures 18 and 19 that the center of the beam 32 and the outer tube have been shifted laterally in an inward direction when the parts assume the position shown in Figure 18. It is evident, therefore, that my rubber mounting allows for simple torsional stress in response to interaxle play and also any compounded yield in consequence both of load, torsion and angular or axial deflections. The rubber bushing elements are constantly active to restore to neutral or equalized positions. My invention insures reactively restrained knee-action at each or any group of axle ends and has a universal shock absorbing function to eliminate the destructive character of almost incessant side sway. It will be further understood by those duly familiar with the art of axle mounting, employing rocking beams for establishing connection between a pair of axle structures and a surmounted frame, that a definite measure of axial movement at the rocking pivots must be permitted because of the changing distance between centers as any one or more axle ends become raised or sink. Hitherto, the axial movement which was permitted to occur along the pivot shafts of rocking beams was woefully severe on the bearings and correspondingly troublesome and expensive. Moreover, deflections of the beam ends entailed the hazard of beam fracture and always caused rapid destruction of the bearings. The universality of yield of my rubber mountings has happily eliminated both the hazard and the wear and tear with a simple and inexpensive origination despite the complete dispensation of rear springs which are both heavy and expensive.

Figure 22 is a sufficient illustration of the modification contemplated for bus and coach installation. A frame 45 carries in any appropriate manner across its longitudinal middle a pair of parallel trunnion rods or shafts 46 and on both ends of each, as shown inwardly of the two lateral frame members, are mounted four of my composite bushing structures 47. Each of the bushing structures 47 has one of its metal rubber-confiners attached to an arm 48 which is in turn articulated at its other end with one end of an axle structure. I have designated the two forwardly extending arms 48 to be connected with opposite ends of a front axle structure 49 and the two rearwardly extending arms 48 to be connected with opposite ends of a rearmost axle 50. It will be evident to any automotive engineer that this modification permits independent as well as interrelated functioning of each of the four rubber bushings to effect both a twist thereof or a bodily oscillation of the outer rubber confiner to suit all the relative movements between the axles and superstructure.

Figure 23 is a perspective view of a further modification showing the feasibility of employing the composite bushing feature of my invention to the landing gear of aircraft. A superstructure 51 carries depending brackets 52 which in turn carry a trunnion 53 on which are two laterally spaced composite bushing structures 54 with each of which one end of an arm 55 is operatively connected while the free ends of the arms each carry a landing wheel 56. As shown, the arms 55 extend and decline rearwardly. A wholly obvious variation might be a forked arm connection with both wheels and with a single middle bushing structure; also, with the single arm projecting forwardly instead of rearwardly.

Figure 24 illustrates application of the rubber bushing structure to a springboard. A support or platform 57 includes a trunnion bracket 58, the trunnion being enclosed by the inner rubber retainer 59 which is in turn enveloped by the rubber 60 and the latter in turn enclosed by the outer retaining tube 61 which latter is firmly connected with a springboard 62 intended to overhang the support 57. In this form, the fibers of the rubber 60 are primarily subjected to torsional stress or twist.

I claim:

1. In combination, a vehicle frame comprising trunnion elements at each side thereof, a pair of rigid beams oscillatorily mounted intermediately of their ends on remote ends of said trunnion elements, said beams having bores enveloping said trunnion elements in spaced relation therearound, annular rubber torsion bushings interposed between said beams and trunnion elements and adapted to yield in unison with any deflection strains imparted to ends of said beams and axle structures having a ball and socket connection each with corresponding ends of said beams.

2. In a motor vehicle embodying a chassis frame and a pair of driving axles, a supporting structure for said axles comprising, a pair of brackets affixed to said frame, a second pair of brackets subjacent the first named brackets, lateral flanges thereon, rubber blocks intermediate said brackets, a tube supported by the second named brackets, the end portions thereof constituting trunnions, rubber bushings mounted on said trunnions, arms mounted on said bushings, balls formed in the end portions of said arms, sockets on said axles interengaged with said balls, depending flanges formed in the first named brackets and disposed in telescopic engagement over the second named brackets to delimit longitudinal movement between said brackets and inturned flanges formed in the first named brackets and disposed in telescopic engagement with the lateral flanges in the second bracket to delimit vertical movement between said brackets.

3. In a motor vehicle embodying a chassis frame and a pair of tandem driving axles, a supporting structure for said axles comprising, a bracket affixed to said frame, a second bracket subjacent the first named bracket and mounted for limited movement relative thereto, a tube supported by the second named bracket, rubber bushings mounted on the end portions thereof, arms mounted intermediate their ends upon said rubber bushings, ball and socket connection between said axles and the ends of said arms, said arms and axles defining a rectangle deformable to a parallelogram under deflection of said rubber bushings.

ORPHEUS F. QUARTULLO.